United States Patent
Zhong et al.

(10) Patent No.: US 12,289,074 B2
(45) Date of Patent: Apr. 29, 2025

(54) BACK ELECTROMOTIVE FORCE SENSING CIRCUIT, BACK ELECTROMOTIVE FORCE SENSING METHOD AND DRIVING MODULE OF THREE-PHASE PERMANENT MAGNET MOTOR

(71) Applicant: Silergy Semiconductor Technology (Hangzhou) LTD, Hangzhou (CN)

(72) Inventors: Zhenfeng Zhong, Hangzhou (CN); Xiaodong Huang, Hangzhou (CN); Xinjian Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 190 days.

(21) Appl. No.: 18/107,602

(22) Filed: Feb. 9, 2023

(65) Prior Publication Data

US 2023/0268854 A1    Aug. 24, 2023

(30) Foreign Application Priority Data

Feb. 24, 2022    (CN) .......................... 202210184110.2

(51) Int. Cl.
| | | |
|---|---|---|
| G11B 19/20 | (2006.01) | |
| H02P 6/08 | (2016.01) | |
| H02P 6/182 | (2016.01) | |
| H02P 27/08 | (2006.01) | |

(52) U.S. Cl.
CPC .............. *H02P 6/182* (2013.01); *H02P 6/085* (2013.01); *H02P 27/08* (2013.01)

(58) Field of Classification Search
CPC ........ G11B 19/2009; H02P 6/16; H02P 6/182; H02P 6/085; H02P 27/08
See application file for complete search history.

(56) References Cited

U.S. PATENT DOCUMENTS

| | | |
|---|---|---|
| 6,346,785 B1 | 2/2002 | Dainez et al. |
| 7,339,406 B2 | 3/2008 | Takeuchi |
| 8,872,457 B2 | 10/2014 | Knecht |
| 9,716,454 B2 | 7/2017 | Huang et al. |
| 9,774,285 B2 | 9/2017 | Huang et al. |
| 9,837,946 B2 | 12/2017 | Feng et al. |
| 9,917,539 B1 * | 3/2018 | Omura ...................... H02P 6/16 |
| 10,812,006 B2 | 10/2020 | Huang et al. |
| 2011/0031922 A1 | 2/2011 | Sajai et al. |
| 2012/0256573 A1 | 10/2012 | Ikei |
| 2015/0097510 A1 | 4/2015 | Katayama et al. |
| 2016/0144508 A1 | 5/2016 | Nakajima |
| 2018/0083557 A1 * | 3/2018 | Kurosawa .......... G11B 19/2009 |

* cited by examiner

*Primary Examiner* — Cortez M Cook

(57) ABSTRACT

A back electromotive force sensing circuit can include: a sampling circuit configured to acquire a sampling signal representing a phase current of one of three phases of a three-phase permanent magnet motor, where the three-phase permanent magnet motor adopts sine wave control; and a signal processing circuit configured to receive the sampling signal, and to obtain a back electromotive force of the one phase according to a difference between a phase voltage of the one phase and a sum of a voltage across a phase resistor and a voltage across a phase inductor of the one phase.

15 Claims, 4 Drawing Sheets

BACK ELECTROMOTIVE FORCE SENSING CIRCUIT, BACK ELECTROMOTIVE FORCE SENSING METHOD AND DRIVING MODULE OF THREE-PHASE PERMANENT MAGNET MOTOR

RELATED APPLICATIONS

This application claims the benefit of Chinese Patent Application No. 202210184110.2, filed on Feb. 24, 2022, which is incorporated herein by reference in its entirety.

FIELD OF THE INVENTION

The present invention generally relates to the field of controlling the rotation of a rotating body, and more particularly to back electromotive force sensing circuits and methods, and an associated driving module of a three-phase permanent magnet motor.

BACKGROUND

In order to reduce control costs and save installation space of position sensors, three-phase permanent magnet motors can be controlled without position sensors. The most common approach to finding the position of the motor without position sensor is to observe the back electromotive force of the motor. A back electromotive force observation approach with single-phase current detection can be used to control of three-phase permanent magnet motor without a position sensor, and the back electromotive force of the motor can be directly obtained through the electrical relationship of the motor.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
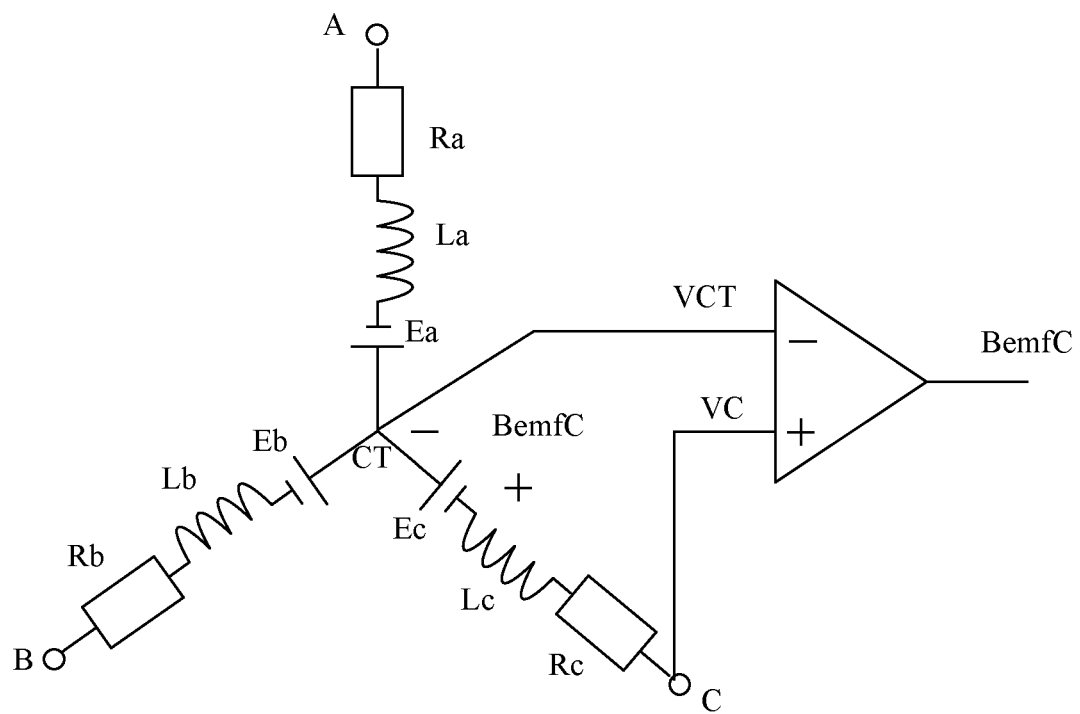
FIG. 1 is a schematic diagram of an example back electromotive force observation method for BLDC.

Referring now to FIG. 1, shown is a schematic diagram of an example back electromotive force observation method of a brushless direct current motor (BLDC). The back electromotive force of phase c can be obtained by the motor electrical relationship $BemfC=(VC-VCT)-Rc*Ic$, and then term $Rc*Ic$ may further be ignored when the C phase is suspended. Thus $BemfC=VC-VCT$, where VC is the terminal voltage of the C phase and VCT is the voltage at the motor center point. This approach can be used in BLDC motor with square wave control. When sine wave control is used, the three phases of the permanent magnet motor may not be suspended, so there can be a relatively large error when using this approach to observe the back electromotive force.

Figure 2:
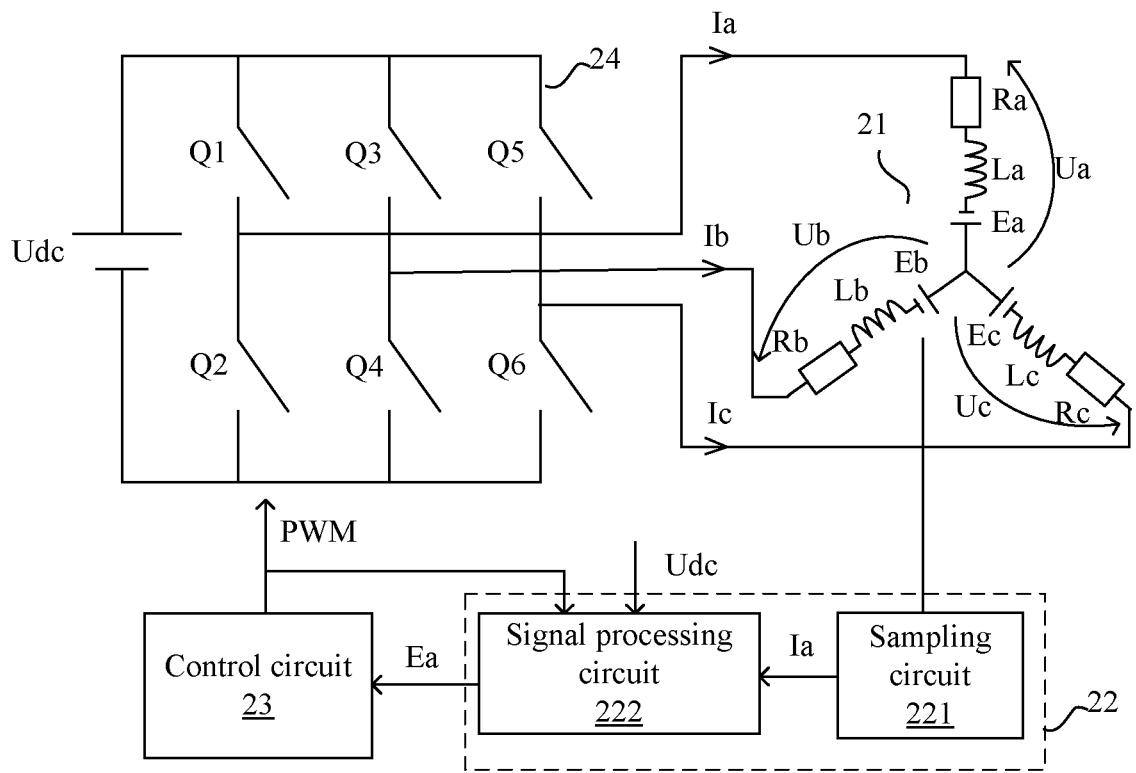
FIG. 2 is a schematic diagram of an example three-phase permanent magnet motor system, in accordance with embodiments of the present invention.

Referring now to FIG. 2, shown is a schematic diagram of an example three-phase permanent magnet motor system, in accordance with embodiments of the present invention. In this particular example, the three-phase permanent magnet motor system can include three-phase permanent magnet motor 21, and a three-phase permanent magnet motor driving module including back electromotive force sensing circuit 22, control circuit 23, and driving circuit 24. Here, three-phase permanent magnet motor 21 is described by taking a brushless DC motor as an example. The brushless DC motor can be equivalent to a structure including three stator windings a, b and c. The brushless DC motor may have three symmetrical phases, and each phase can include corresponding a phase resistor, a phase inductor, and a back electromotive force. Here, set phase resistors $Ra=Rb=Rc$ and phase inductors $La=Lb=Lc$, and the back electromotive forces of three phases are respectively Ea, Eb and Ec.

In the example three-phase permanent magnet motor driving module, back electromotive force sensing circuit 22 can obtain the back electromotive force of the current phase according to DC bus voltage Udc at the current sampling time, pulse-width modulation (PWM) chopping duty ratios PWMa, PWMb and PWMc of the three-phase bridge arms in driving circuit 24, and the sampling signals of the phase current of one of the three phases at the current sampling time and the last sampling time. For example, back electromotive force sensing circuit 22 of the three-phase permanent magnet motor can include sampling circuit 221 and signal processing circuit 222. Sampling circuit 221 can obtain a sampling signal representing a phase current of one phase. Signal processing circuit 222 may receive the sampling signal to generate the back electromotive force of the phase according to the difference between the phase voltage of the phase and the sum of the voltage on the phase resistor and the voltage on the phase inductor.

Signal processing circuit 22 may include a phase inductor voltage processing circuit, a phase voltage processing circuit, and a phase resistor voltage processing circuit. For example, the phase inductor voltage processing circuit can discretize the product of the phase inductor and the differential of the sampling signal obtained by sampling circuit 221 to obtain the voltage across the phase inductor. Alternatively, the phase inductor voltage processing circuit can discretize the product of the phase inductor and the differential of the sampling signal obtained by sampling circuit 221, and then may perform digital filtering to obtain the voltage across the phase inductor. The phase voltage processing circuit can discretize the phase voltage signal to obtain the phase voltage. The phase resistor voltage processing circuit may discretize the product of the sampling signal obtained by sampling circuit 221 and the phase resistor to obtain the voltage across the phase resistor.

Control circuit 23 can obtain a zero-crossing point of the back electromotive force of one phase and the motor speed according to the back electromotive force of the corresponding phase, in order to calculate the motor rotor position, and then may generate PWM chopping duty ratios PWMa, PWMb and PWMc of the three phase bridge arms according to the motor rotor position and the DC bus voltage.

Driving circuit 24 can be controlled by PWM chopping duty ratios PWMa, PWMb and PWMc of the three phase bridge arms, such that the driving current of the three-phase permanent magnet motor is sinusoidal. For example, driving circuit 24 may be formed by three-phase inverter circuit. Transistors Q1 and Q2 can be used as switches of the upper arm bridge and the lower arm bridge of the a-phase stator winding, transistors Q3 and Q4 can be used as switches of the upper arm bridge and the lower arm bridge of the b-phase stator winding, and transistors Q5 and Q6 can be used as switches of the upper arm bridge and the lower arm bridge of the c-phase stator winding. For example, transistors Q1-Q6 may be controlled to be turned on and off according to PWM chopping duty ratios PWMa, PWMb and PWMc, such that one of a, b, and c phase stator windings can connect to the positive terminal of DC bus voltage Udc, another one can connect to the negative terminal of DC bus voltage Udc, and the third one can be in a power-off state. Each of transistors Q1 to Q6 can connect in parallel with a freewheeling diode. Therefore, control circuit 23 can control the drive signals output by drive circuit 24 to the brushless DC motor by controlling the value of the PWM duty ratio of each transistor.

In particular embodiments, when back electromotive force sensing circuit 22 of the three-phase permanent magnet motor obtains the back electromotive force of a certain phase, it may first obtain the expression between the back electromotive force of one phase and the phase voltage, phase current, phase resistor, and phase inductor of that phase according to the motor voltage equation. Then, the expression can be discretized. Subsequently, digital filtering may be carried out on the part corresponding to the differential term in the expression. Finally, the back electromotive force of the corresponding phase can be obtained according to the expression.

When the three-phase permanent magnet motor is controlled, the back electromotive force of the motor can be calculated only by sampling the phase current of one phase and the DC bus voltage, and then the position information of the stator rotor can be obtained. In addition, the expression of the back electromotive force can be directly obtained through the motor voltage equation, and the differential term in the expression is filtered, such that the fluctuation of the calculated back electromotive force is reduced.

Referring to the circuit structure diagram of the three-phase permanent magnet motor system in FIG. 2, on the premise that the motor is symmetrical in three phases, the phase resistors Ra=Rb=Rc, the phase inductors La=Lb=Lc, and the back electromotive forces of three phases are respectively Ea, Eb and Ec. The relationship between back electromotive force and the phase voltage, phase current, phase resistor and phase inductor can be obtained according to the motor voltage equation can be as shown in Formula (1):

$$Ea = Ua - RaIa - La\frac{dIa}{dt} \quad (1)$$

In Formula (1), Ea is the back electromotive force of phase a, Ua is the phase voltage signal of phase a, Ra is the phase resistor of phase a, Ia is the sampling signal of the phase current of phase a, and La is the phase inductor of phase a. Back electromotive force Ea of phase a equals to phase voltage signal Ua of phase a minus the voltage across phase resistor Ra and the the voltage across phase inductor La of phase a. As long as phase voltage signal Ua of phase a and sampling signal Ia of the phase current of phase a at each moment can be calculated or detected, back electromotive force Ea of phase a can be calculated.

The phase voltage of phase a can be calculated according to PWM chopping duty ratios PWMa, PWMb, and PWMc of the three-phase bridge arms given by control circuit 23 and DC bus voltage Udc detected by the ADC, and the calculation formula is as follows:

$$Ua = Udc \times \left(PWMa - \frac{PWMa + PWMb + PWMc}{3}\right) \quad (2)$$

In Formula (2), Ua is the phase voltage signal of phase a, Udc is DC bus voltage, PWMa, PWMb, PWMc are respectively PWM chopping duty ratios of three-phase bridge arms. For example, sampling signal Ia of the phase current of phase a can be obtained by a sampling resistor or other suitable approaches, phase resistor Ra of phase a and phase inductor La of phase a can be measured by instruments, and the voltage across phase inductor La of phase a involves the differentiation of the current. If the part corresponding to the differential term is represented as La×Didt, the processing of the part of Didt can be obtained by the following formula in the discrete control system:

$$\frac{dI_a}{dt} = \frac{I_a[kTs] - I_a[(k-1)Ts]}{Ts} \quad (3)$$

In Formula (3), Ts is the system sampling period, Ia[kTs] is the sampling signal of the phase current of phase a obtained at sampling moment kTs, and Ia[(k−1)Ts] is the sampling signal of the phase current of phase a obtained at sampling moment (k−1)Ts, in order to calculate the current differential. By bringing Formulas (2) and (3) into Formula (1), the discretized back electromotive force calculation formula can be obtained as follows:

$$Ea[kTs] = \\ Udc[kTs] \times \left(PWMa[kTs] - \frac{PWMa[kTs] + PWMb[kTs] + PWMc[kTs]}{3}\right) - \\ Ra \times Ia[kTs] - La \times \frac{Ia[kTs] - Ia[(k-1)Ts]}{Ts} \quad (4)$$

In Formula (4), Udc[kTs], PWMa[kTs], PWMb[kTs], PWMc[kTs] and Ia[kTs] are the sampling signals of DC bus voltage, PWM chopping duty ratios of three-phase bridge arms, and the phase current of phase a obtained at sampling moment kTs, respectively, and Ia[(k−1)Ts is the sampling signal of the phase current of phase a obtained at sampling moment (k−1)Ts.

Particular embodiments may provide a back electromotive force calculation method based on Formula (4), which can be effectively and stably used for the sine wave control of a three-phase permanent magnet motor. As compared with the back electromotive force observation approach that ignores the product term of the phase inductor and the differential of the phase current, although omitting the product term of inductor and current differential reduces the complexity of the algorithm, this can lead to great deviation in back electromotive force observation when the motor speed is high and the current is high, and even lead to out-of-step phenomenon.

However, the introduction of the current differential term into the back electromotive force observation formula may cause the following problems. Since the current differential is obtained by directly dividing the difference between the phase currents sampled at sampling moment kTs and sampling moment (k−1)Ts by sampling period Ts, the accuracy of the phase current sampling may be limited to the accuracy of ADC, which can result in errors. However, sampling period Ts is typically relatively small, and the sampling error of ADC can be amplified after dividing the difference between the sampled phase currents by the sampling period. If the back electromotive force is calculated directly according to Formula (4), the calculated back electromotive force may fluctuate greatly when the motor speed is high and the motor inductor is relatively large.

Figure 3:
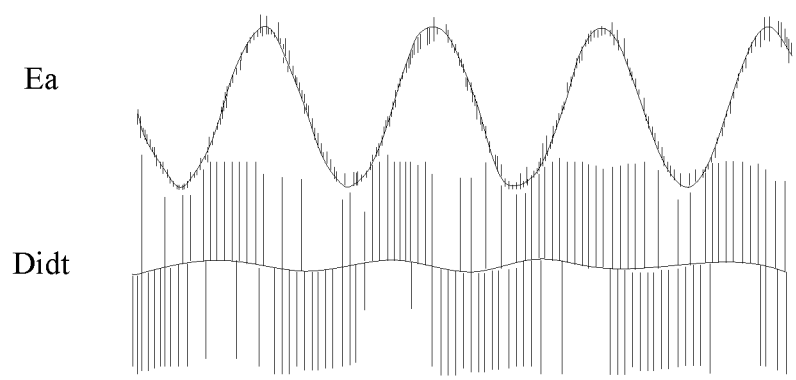
FIG. 3 is a waveform diagram of an example back electromotive force and current differential without filtering by using the back electromotive force calculation method, in accordance with embodiments of the present invention.

Referring now to FIG. 3, shown is a waveform diagram of the back electromotive force and current differential without filtering by using the back electromotive force calculation method, in accordance with embodiments of the present invention. From the waveforms of back electromotive force Ea (as CH1 shown in FIG. 3) and current differential term Didt (as CH2 shown in FIG. 3), the fluctuation of the current differential term leads to the fluctuation of the back electromotive force observed by Formula (4). Based on the above, Formula (4) is further processed. When the part corresponding to the differential term is expressed as La×Didt, the result obtained after digital filtering processing of Didt can be expressed by:

$$Didt_{filter}[kTs] = (1-f) \times Didt_{filter}[(k-1)Ts] + f \times Didt[kTs] \quad (5)$$

$$Didt[kTs] = \frac{Ia[kTs] - Ia[(k-1)Ts]}{Ts} \quad (6)$$

In Formula (5), f is the digital filter coefficient, and f is a positive number less than 1, the initial value of $Didt_{filter}$ is 0. Further, Formula (7) can be obtained by replacing the current differential term in Formula (4) with Formula (5), and Formula (7) is the calculation formula for back electromotive force finally used in the invention:

$$Ea[kTs] = \quad (7)$$
$$Udc[kTs] \times \left(PWMa[kTs] - \frac{PWMa[kTs] + PWMb[kTs] + PWMc[kTs]}{3}\right) -$$
$$Ra \times Ia[kTs] - La \times Didt_{filter}[kTs]$$

Figure 4:
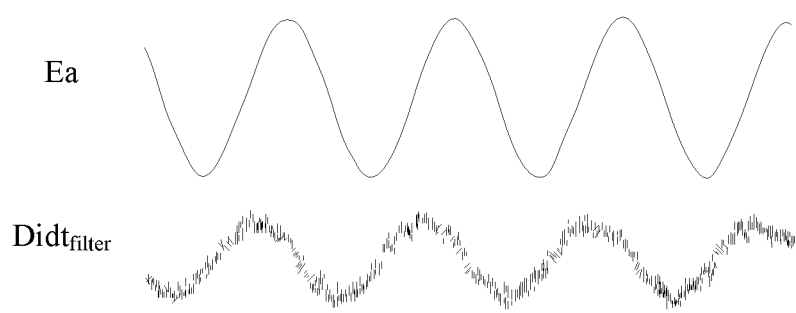
FIG. 4 is a waveform diagram of an example back electromotive force and current differential after filtering by using the back electromotive force calculation method, in accordance with embodiments of the present invention.

Referring now to FIG. 4, shown is the waveform of back electromotive force Ea calculated by Formula (7) and current differential term $Didt_{filter}$ after digital filtering. In this particular example, the waveform fluctuation of the back electromotive force and current differential term obtained by the back electromotive force calculation can clearly be reduced.

After the back electromotive force of one phase is obtained, the zero-crossing point of the back electromotive force can be obtained by judging whether the back electromotive force changes from negative to positive or from positive to negative. Then, the motor speed can be calculated by the time between two zero-crossing points of the back electromotive force of the same phase, and the motor rotor position can be further calculated. Further, the PWM chopping duty ratios PWMa, PWMb, and PWMc of the three-phase bridge arms can be generated according to the motor rotor position and the DC bus voltage, in order to achieve the purpose of sine wave current control of the permanent magnet motor.

As described above, particular embodiments may provide a method for calculating the back electromotive force of a three-phase permanent magnet motor by sampling the phase current of one phase and the bus voltage. In certain embodiments, the expression of the back electromotive force can directly be obtained through the motor voltage equation, and after the expression is discretized, the differential term in the expression may be filtered to reduce the fluctuation of the calculated back electromotive force. The back electromotive force calculation formula of certain embodiments can be used to estimate the back electromotive force of the permanent magnet motor in sine wave control. Thus, the example control method is relatively simple and stable, and the cost relatively low since the phase current of one phase needs to be sampled.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A back electromotive force sensing circuit, comprising:
   a) a sampling circuit configured to acquire a sampling signal representing a phase current of one of three phases of a three-phase permanent magnet motor, wherein the three-phase permanent magnet motor adopts sine wave control;
   b) a signal processing circuit configured to receive the sampling signal, and to obtain a back electromotive force of the one phase according to a difference between a phase voltage of the one phase and a sum of a voltage across a phase resistor and a voltage across a phase inductor of the one phase; and
   c) wherein the signal processing circuit comprises a phase inductor voltage processing circuit configured to discretize a product of the phase inductor and a differential of the sampling signal to obtain the voltage across the phase inductor.

2. A driving module of a three-phase permanent magnet motor, comprising the back electromotive force sensing circuit of claim 1, and further comprising:
   a) a control circuit configured to obtain zero-crossing points of the back electromotive force and a motor speed according to the back electromotive force, in order to calculate a motor rotor position, and to generate PWM chopping duty ratios of three-phase bridge arms according to the motor rotor position and the DC bus voltage; and
   b) a driving circuit controlled by the PWM chopping duty ratios of the three-phase bridge arms, such that driving currents of the three-phase permanent magnet motor are sine waves.

3. A back electromotive force sensing circuit, comprising:
a) a sampling circuit configured to acquire a sampling signal representing a phase current of one of three phases of a three-phase permanent magnet motor, wherein the three-phase permanent magnet motor adopts sine wave control;
b) a signal processing circuit configured to receive the sampling signal, and to obtain a back electromotive force of the one phase according to a difference between a phase voltage of the one phase and a sum of a voltage across a phase resistor and a voltage across a phase inductor of the one phase; and
c) wherein the signal processing circuit comprises a phase inductor voltage processing circuit configured to discretize a product of the phase inductor and a differential of the sampling signal, and to perform digital filtering to obtain the voltage across the phase inductor.

4. The back electromotive force sensing circuit of claim 3, wherein the digital filtering comprises a first-order low-pass digital filtering.

5. The back electromotive force sensing circuit of claim 3, wherein:
a) the product of the phase inductor and the differential of the sampling signals after discretization is expressed as La×Didt;
b) a result of the digital filtering of Didt is $$Didt_{filter}[kTs]=(1-f)\times Didt_{filter}[(k-1)Ts]+f\times Didt[kTs]$$

c)

$$Didt[kTs] = \frac{Ia[kTs] - Ia[(k-1)Ts]}{Ts}$$

d) Ia[kTs] is a sampling signal of the phase current of phase a obtained at a current sampling moment of kTs, and Ia[(k−1)Ts] is a sampling signal of the phase current of phase a obtained at a last sampling moment of (k−1)Ts, Ts is a system sampling period;
e) f is a digital filter coefficient that is a positive number less than 1; and
f) an initial value of $Didt_{filter}$ is 0.

6. The back electromotive force sensing circuit of claim 3, wherein the signal processing circuit further comprises:
a) a phase voltage processing circuit configured to discretize a phase voltage signal to obtain the phase voltage; and
b) a phase resistor voltage processing circuit configured to discretize the product of the sampling signal and the phase resistor to obtain the voltage across the phase resistor.

7. The back electromotive force sensing circuit of claim 6, wherein the phase voltage processing circuit is configured to receive a DC bus voltage and PWM chopping duty ratios of the three-phase bridge arms, in order to generate the phase voltage signal, wherein the phase voltage signal is in direct proportion to the DC bus voltage.

8. The back electromotive force sensing circuit of claim 7, wherein the phase voltage processing circuit is configured to obtain the phase voltage at a current sampling moment according to a product of the DC bus voltage obtained at the current sampling moment and a difference between the PWM chopping duty ratio of the one phase obtained at the current sampling moment and an average value of the PWM chopping duty ratios of three-phase bridge arms.

9. The back electromotive force sensing circuit of claim 6, wherein the phase resistor voltage processing circuit is configured to obtain the voltage across the phase resistor at the current sampling moment according to a product of the sampling signal obtained at the current sampling moment and the phase resistor.

10. A method of back electromotive force sensing, the method comprising:
a) sampling only one phase current of one of the three phases of three-phase permanent magnet motor, wherein the three-phase permanent magnet motor adopts sine wave control;
b) obtaining a back electromotive force at a current sampling moment according to a difference between a phase voltage at the current sampling moment and a sum of a voltage across a phase resistor of the one phase and a voltage across a phase inductor of the one phase at the current sampling moment;
c) obtaining the phase voltage at the current sampling moment according to a DC bus voltage at the current sampling moment and PWM chopping duty ratios of three-phase bridge arms;
d) obtaining the voltage across the phase resistor of the one phase at the current sampling moment according to the sampling signal of the phase current of the one phase at the current sampling moment and the phase resistor of the one phase; and
e) obtaining the voltage across the phase inductor of the one phase at the current sampling moment according to the sampling signals of the phase current at the current sampling moment and at a last sampling moment and the phase inductor of the one phase.

11. The method of claim 10, further comprising obtaining the phase voltage of the one phase at the current sampling moment by multiplying the DC bus voltage obtained at the current sampling moment and a difference between a PWM chopping duty ratio of the one phase obtained at the current sampling moment and an average value of the PWM chopping duty ratios of the three-phase bridge arms obtained at the current sampling moment.

12. The method of claim 10, further comprising obtaining the voltage across the phase resistor at the current sampling moment by multiplying the sampling signal obtained at the current sampling moment and the phase resistor.

13. The method of claim 10, further comprising:
a) obtaining the sampling signal at the current sampling moment and the sampling signal at the last sampling moment; and
b) multiplying a ratio of a difference between the two sampling signals and a system sampling period by the phase inductor, in order to obtain the voltage across the phase inductor at the current sampling moment.

14. The method of claim 10, further comprising:
a) obtaining the sampling signal at the current sampling moment and the sampling signal at the last sampling moment;
b) performing a digital filtering a ratio of a difference between the two sampling signals and a system sampling period; and
c) multiplying the digitally filtered ratio by the phase inductor to obtain the voltage across the phase inductor at the current sampling moment.

15. The method of claim 14, wherein the digital filtering comprises a first-order low-pass digital filtering.

* * * * *